United States Patent Office 3,541,159
Patented Nov. 17, 1970

3,541,159
FLUORINATED ALLYL ETHERS AND USE THEREOF
Allen G. Pittman, El Cerrito, and William L. Wasley, Berkeley, Calif., assignors to the United States of America as represented by the Secretary of Agriculture
No Drawing. Application Apr. 23, 1968, Ser. No. 740,013, which is a division of application Ser. No. 647,273, Apr. 27, 1967, now Patent No. 3,437,692, which in turn is a division of application Ser. No. 433,818, Feb. 18, 1965, now Patent No. 3,382,222. Divided and this application June 30, 1969, Ser. No. 835,217
The portion of the term of the patent subsequent to May 7, 1985, has been disclaimed
Int. Cl. C07c *43/00*
U.S. Cl. 260—614        4 Claims

ABSTRACT OF THE DISCLOSURE

Allyl fluoro-alkyl ethers are prepared by reacting a fluorine-containing ketone with an alkali-metal halide and then, without isolating the intermediate, reacting it with an allyl halide to yield the desired ether, typically allyl heptafluoroisopropylether where the starting ketone is fluoroacetone. The allyl ether products are useful, in monomeric and especially polymeric form, for enhancing the repellency of fibrous materials, e.g., textiles.

---

This a division of our copending application Ser. No. 740,013, filed Apr. 23, 1968, which in turn is a division of Ser. No. 647,273, filed Apr. 27, 1967, now Pat. 3,437,692, which in turn is a division of Ser. No. 433,818, filed Feb. 18, 1965, now Pat. 3,382,222.

A nonexclusive, irrevocable, royalty-free license in the invention herein described, throughout the world for all purposes of the United States Government, with the power to grant sub-licenses for such purposes, is hereby granted to the Government of the United States of America.

This invention relates to and has among its objects the provision of novel processes for preparing fluorinated compounds, particularly fluorinated allyl ethers and polymers thereof; the provision of the compounds as new compositions of matter; and procedures for treating fibrous materials, especially textiles, with the compounds. Further objects of the invention will be evident from the following description wherein parts and percentages are by weight unless otherwise specified.

The symbol "A" is used herein to designate the allyl radical $$CH_2=CH-CH_2-$$

In conventional practice if it is desired to convert a ketone into an allyl ether, the following procedure is used: The ketone is reduced to an alcohol and the alcohol is converted into an alcoholate which is then etherified with an allyl halide. Thus:

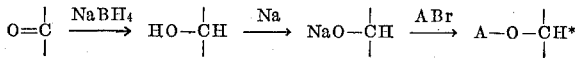

It is to be particularly observed that the conventional procedure requires a reduction step and that the ether product contains a hydrogen atom on the alpha position of the alcohol residue. (This hydrogen atom is indicated above by the asterisk.)

In accordance with the invention, *fluorinated* allyl ethers are prepared from ketones. In a first step the ketone is reacted with an alkali metal fluoride to convert the carbonyl radical of the ketone into an alkali metal fluorocarbinolate radical, that is, a fluorocarbinol group wherein the hydrogen of the hydroxyl radical is replaced by alkali metal. Thus:

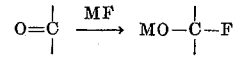

In the above formula M stands for an alkali metal. (Note: No novelty is claimed herein for this first step per se; it is disclosed and claimed in our prior application, Ser. No. 398,129, now Pat. No. 3,384,628, filed Sept. 21, 1964.)

In a second step, the fluorocarbinolate intermediate is reacted with an allyl halide (e.g., allyl chloride, bromide, or iodide) to form an allyl ether, as follows:

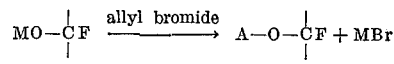

By this simple two-step synthesis, many different kinds of fluorinated allyl ethers can be produced in yields as high as 80% of the theoretical. The reactions may be further exemplified by the following formulas, which depict the synthesis of heptafluoroisopropyl allyl ether from hexafluoroacetone:

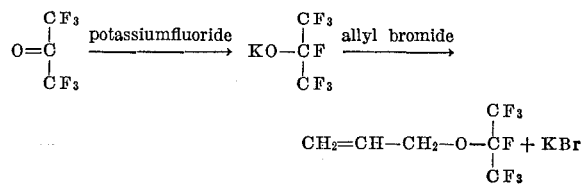

It is evident from the above formulas that the synthesis converts the ketone function to an ether function without requiring the use of a reducing agent and concomitantly a fluorine group is added, that is, the allyl ether contains a fluorine group on the alpha carbon atom of the alcohol moiety. This is an unusual and heretofore unknown type of structure which gives the products especially useful properties. For example, the products can be used to provide oil-, water-, and soil-repellent finishes on textiles and the repellency attained is substantially greater that that achieved with the corresponding compounds wherein the same position is occupied by hydrogen.

The process of the invention is by no means limited to the example above but is of great versatility and, generically, can be applied to any aliphatic (open-chain or closed-chain) ketone which contains at least two fluorine groups adjacent to the carbonyl group. In other words, the carbon atoms connected to the carbonyl group must contain at least two fluorine atoms—distributed on these carbon atoms symmetrically or asymmetrically. These fluorine groups are a critical item to activate the carbonyl group so that it will undergo the desired transformation when contacted with the alkali metal fluoride. Especially good results are obtained when the carbon atoms adjacent to the carbonyl radical contain halogen radicals (i.e., F, Cl, Br, or I) in addition to the minimum of two fluorine groups. In this connection it may be noted that although halogens of higher atomic weight than fluorine— i.e., Cl, Br, and I—are not effective by themselves to activate the carbonyl group, they can be employed to supplement the activating influence of fluorine groups. Beyond the positions adjacent to the carbonyl group, the structure of the ketone is of no criticality to the process and available sites may be occupied, for example, by hydrogen or halogen. In other words, the critical item for the process aspect of this invention is that the starting compound contain a carbonyl group activated by adjacent fluorine atoms as explained hereinabove; the remainder of the starting compound is not material to the process. Of course, this remainder may be limited in accordance with certain parameters to provide particular desired characteristics in the allyl ether products. However, such limitation concerns the character of the allyl ether *product*, not the operation of the process.

Typical examples of ketones to which the process of the invention may be applied and the corresponding ether products are given below by way of illustration but not limitation. As noted above, the symbol "A" stands for the allyl radical:

$$CH_2=CH-CH_2-$$

| Ketone (starting compound) | Allyl ether (product) |
|---|---|
| $CF_3-(CF_2)_n-\overset{O}{\underset{\parallel}{C}}-(CF_2)_{n'}-CF_3$ | $CF_3-(CF_2)_n-\underset{F}{\overset{A-O}{\underset{\vert}{C}}}-(CF_2)_{n'}-CF_3$ |
| wherein $n$ and $n'$ are each a number from 0 to 10 | |
| $(CF_3)_2CF-\overset{O}{\underset{\parallel}{C}}-CF(CF_3)_2$ | $(CF_3)_2CF-\underset{F}{\overset{A-O}{\underset{\vert}{C}}}-CF(CF_3)_2$ |
| $CF_3-(CF_2)_n-\overset{O}{\underset{\parallel}{C}}-CF(CF_3)_2$ | $CF_3-(CF_2)_n-\underset{F}{\overset{A-O}{\underset{\vert}{C}}}-CF(CF_3)_2$ |
| wherein $n$ is a number from 0 to 18 | |
| $R-\overset{O}{\underset{\parallel}{C}}-CF(CF_3)_2$ | $R-\underset{F}{\overset{A-O}{\underset{\vert}{C}}}-CF(CF_3)_2$ |
| wherein R represents the heptafluorocyclobutyl radical | |
| $O=\overset{\frown}{C}\;(CF_2)_n$ | $F-O-\overset{\frown}{C-F}\;(CF_2)_n$ |
| wherein $n$ is a number from 3 to 10 | |

| Compounds containing other halogen atoms in addition to fluorine (Y is Cl, Br, or I) | |
|---|---|
| $YCF_2-\overset{O}{\underset{\parallel}{C}}-CF_3$ | $YCF_2-\underset{F}{\overset{A-O}{\underset{\vert}{C}}}-CF_3$ |
| $YCF_2-\overset{O}{\underset{\parallel}{C}}-CF_2Y$ | $YCF_2-\underset{F}{\overset{A-O}{\underset{\vert}{C}}}-CF_2Y$ |
| $Y_2CF-\overset{O}{\underset{\parallel}{C}}-CF_2Y$ | $Y_2CF-\underset{F}{\overset{A-O}{\underset{\vert}{C}}}-CF_2Y$ |
| $Y_2CF-\overset{O}{\underset{\parallel}{C}}-CFY_2$ | $Y_2CF-\underset{F}{\overset{A-O}{\underset{\vert}{C}}}-CFY_2$ |
| $CF_3-(CF_2)_n-\overset{O}{\underset{\parallel}{C}}-CF_2Y$ | $CF_3-(CF_2)_n-\underset{F}{\overset{A-O}{\underset{\vert}{C}}}-CF_2Y$ |
| wherein $n$ is a number from 0 to 18 | |
| $CF_3-(CF_2)_n-\overset{O}{\underset{\parallel}{C}}-CFY_2$ | $CF_3-(CF_2)_n-\underset{F}{\overset{A-O}{\underset{\vert}{C}}}-CFY_2$ |
| wherein $n$ is a number from 0 to 18 | |

| Compounds containing hydrogen in addition to fluorine ($n$ and $n'$ are each a number from 1 to 18) | |
|---|---|
| $H(CF_2)_n-\overset{O}{\underset{\parallel}{C}}-(CF_2)_{n'}H$ | $H(CF_2)_n-\underset{F}{\overset{A-O}{\underset{\vert}{C}}}-(CF_2)_{n'}H$ |
| $H(CF_2)_n-\overset{O}{\underset{\parallel}{C}}-(CF_2)_{n'}F$ | $H(CF_2)_n-\underset{F}{\overset{A-O}{\underset{\vert}{C}}}-(CF_2)_{n'}F$ |
| $H(CF_2)_n-\overset{O}{\underset{\parallel}{C}}-CF(CF_3)_2$ | $H(CF_2)_n-\underset{F}{\overset{A-O}{\underset{\vert}{C}}}-CF(CF_3)_2$ |
| $R-\overset{O}{\underset{\parallel}{C}}-C_nF_{2n+1}$ | $R-\underset{F}{\overset{A-O}{\underset{\vert}{C}}}-C_nF_{2n+1}$ |
| wherein R represents an alkyl group containing 1 to 18 carbon atoms or a cycloalkyl group such as cyclopropyl, cyclobutyl, or cyclohexyl | |

It is also within the broad scope of the invention to utilize, as the starting material, ketones containing more than one carbonyl group. By adjustment of the proportions of reactants in line with usual stoichimetrical relationships, diethers are produced. Typical in this category are the following:

| Ketone | Allyl ether |
|---|---|
| $(CF_3)_2CF-\overset{O}{\underset{\parallel}{C}}-\overset{O}{\underset{\parallel}{C}}-CF(CF_3)_2$ | $(CF_3)_2CF-\underset{F}{\overset{A-O}{\underset{\vert}{C}}}-\underset{F}{\overset{O-A}{\underset{\vert}{C}}}-CF(CF_3)_2$ |
| $(CF_3)_2CF\overset{O}{\underset{\parallel}{C}}-(CF_2)_3-\overset{O}{\underset{\parallel}{C}}-CF(CF_3)_2$ | $(CF_3)_2CF\underset{F}{\overset{A-O}{\underset{\vert}{C}}}-(CF_2)_3-\underset{F}{\overset{A-O}{\underset{\vert}{C}}}-CF(CF_3)_2$ |

Generically, a preferred class of ketones which may be used in the process of the invention and the intermediates and the allyl ethers formed therefrom may be represented by the following structures:

| (A) Ketone | (B) Alkali metal fluorocarbinolate | (C) Allyl ether |
|---|---|---|
| $R-\underset{\underset{R}{\vert}}{\overset{\overset{R}{\vert}}{C}}-R$ $O=C$ $R-\underset{\underset{R}{\vert}}{\overset{\overset{}{}}{C}}-R$ | $R-\underset{\underset{R}{\vert}}{\overset{\overset{R}{\vert}}{C}}-R$ $MO-CF$ $R-\underset{\underset{R}{\vert}}{\overset{\overset{}{}}{C}}-R$ | $R-\underset{\underset{R}{\vert}}{\overset{\overset{R}{\vert}}{C}}-R$ $A-OCF$ $R\overset{}{C}R$ $\underset{R}{\vert}$ | wherein each R represents a member of the group consisting of hydrogen, halogen, alkyl, haloalkyl, cycloalkyl, and halocycloalkyl and wherein at least two of the R's are fluorine. M represents an alkali metal.

The allyl ethers responding to the structure given above in column C are new compounds, not heretofore prepared or described. Another group of new compounds are the cyclic allyl ethers, e.g., those responding to the formula $$A-O-\overset{\frown}{CF}\;(CF_2)_n$$

wherein $n$ is a number from 3 to 10, which may be prepared from the corresponding cyclic ketones:

$$O=\overset{\frown}{C}\;(CF_2)_n$$

Particularly preferred for treating fibrous materials, e.g., textiles, are the allyl ethers of the structure shown below and the polymers derived from these ethers:

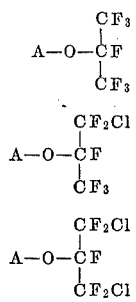

$$A-O-\underset{\underset{CF_3}{|}}{\overset{\overset{CF_3}{|}}{C}}F$$

$$A-O-\underset{\underset{CF_3}{|}}{\overset{\overset{CF_2Cl}{|}}{C}}F$$

$$A-O-\underset{\underset{CF_2Cl}{|}}{\overset{\overset{CF_2Cl}{|}}{C}}F$$

As noted above, in the first step of the synthesis the fluoroketone is reacted with an alkali metal fluoride. As the latter reagent, potassium fluoride is generally preferred, but the fluorides of sodium, cesium, and rubidium may also be used. The reaction is generally conducted in an inert solvent for the ketone, for example, acetonitrile, dioxane, tetrahydrofuran, tetramethylene sulphone, diglyme (an abbreviated name for dimethyl ether of diethylene glycol), etc. The alkali metal fluoride is only slightly soluble in these solvents and the disappearance of undispersed alkali metal fluoride during the reaction supplies a useful indication of formation of the desired intermediate (which is soluble). The temperature of reaction is not critical. Generally, temperatures over 35° C. are avoided to prevent decomposition of the intermediate. Usually, the reaction is conducted at room temperature for convenience but it does take place at much lower temperatures. Where the starting ketone is a gas (for example, hexafluoroacetone) it is preferred to cool the system first to get the ketone into solution. Then, the temperature can be increased—for example, allowed to warm to room temperature—to accelerate the reaction. To prevent hydrolysis of the intermediate, the reaction is conducted under anhydrous conditions. It is also helpful to remove air (which may contain moisture) by flushing the reaction vessel with dry, inert gas such as nitrogen. When the intermediate is formed—as evidenced by disappearance of undissolved alkali metal fluoride—the system is ready for further treatment. Generally, the intermediate is not isolated but is employed just as it is formed. The etherification is accomplished simply by adding the allyl halide (i.e., allyl chloride, allyl bromide, or allyl iodide) to the reaction system containing the intermediate and stirring the mixture. The temperature at which the etherification is conducted is not a critical factor and may vary, for example, from 20 to 100° C. Generally, the higher temperatures in this range, namely about 50 to 100° C., are preferred to increase the rate of reaction.

The allyl ether is recoverd from the reaction system in the following manner: The precipitated inorganic halide (for example, potassium bromide where the reactants are allyl bromide and a potassium fluorocarbinolate) is removed and water is added to the reaction mixture. The organic phase containing the allyl ether is removed from the aqueous phase and is then dried and the product separated by distillation. In the alternative, the reaction mixture may be filtered to remove alkali metal salt and the product isolated by distillation.

The allyl ethers produced in accordance with the invention may be used in many areas wherein vinyl compounds in general are employed, e.g., as intermediates in reactions involving the double bond. Moreover, the allyl ethers are polymerizable and can be formed into homopolymers or copolymers by standard techniques used in the polymerization of allyl monomers. Homopolymers can be produced, for example, by mixing the allyl ether with a catalytic quantity of a free radical generator such as benzoyl peroxide or lauryl peroxide and heating the mixture at about 60–120° C. Copolymers can be produced by applying the same procedure to a mixture of the allyl ether plus a different vinyl monomer such as styrene, vinyl chloride, vinyl acetate, vinylidene fluoride, methyl or ethyl acrylate, methyl or ethyl methacrylate, acrylamide, acrylonitrile, or the like. The polymers of the invention are useful where increased thermal stability and solvent resistance are required. Thus, they can be employed in such applications as coating and as adhesives in laminating sheet material where conventional polymers are unsuitable because of solubility in common organic solvents.

A particular phase of the present invention is concerned with the treatment of fibrous materials, such as textiles, in order to improve their properties, e.g., to improve their oil-, water-, and soil-repellency. In practicing this phase of the invention, an allyl ether polymer is prepared as hereinabove described and applied to the fibrous material. The polymer may be a homopolymer, that is, one consisting of recurring units of the allyl ether, or it may be a copolymer, that is, a polymer containing recurring units of the allyl ether interspersed with units derived from the different vinyl monomer, such as styrene, ethyl methacrylate, acrylonitrile, ethylene, propylene, vinylidene fluoride, and the like. The polymers (homo- or copolymers) are applied to the fibrous material in conventional manner. Typically, the polymer is dissolved in an inert, volatile solvent—for example, benzotrifluoride or 1,3-bis-trifluoromethyl benzene—and the resulting solution applied to the fibrous material by a conventional dip and pad technique. By varying the concentration of polymer in solution and the degree of padding, the amount of polymer deposited on the material may be varied. Typically, the amount of polymer may be about from 0.1 to 20%, based on the weight of fibrous material but it is obvious that higher or lower proportions can be used if desired. Usually, in treating textiles such as fabrics the amount of polymer is limited to about 0.1 to 10% to attain the desired repellency improvement without interference with the hand of the textile. Generally, it is preferred to subject the fibrous material to a conventional curing operation after application of the polymer solution thereto in order to bond the polymer to the fibers. As an example of such treatment, the fibrous material is heated in the range of about 50 to 150° C. for a period of about 5 to 30 minutes. The solvent (from the polymer solution) may be evaporated in a separate step prior to curing or may be simply evaporated during the curing operation. In an alternative procedure, the polymers are applied to the fibrous material in the form of an aqueous emulsion, then curing is applied. Fibrous material treated with the polymers of the invention display an increased resistance to becoming soiled because they repel both water- and oil-borne soils and stains. Moreover, the improvements so rendered are durable—they are retained despite laundering and dry-cleaning of the product. In an alternative procedure, the allyl ether in monomeric form is applied to the fibrous substrate and the resulting material subjected to high-energy ionizing radiation to cause the monomer to polymerize in situ on the fibrous substrate.

The invention may be utilized for improving the properties of all types of fibrous materials, for example, paper, cotton; linen hemp; jute; ramie; sisal; cellulose acetate rayons; cellulose acetate-butyrate rayons; saponified acetate rayons; viscose rayons; cuprammonium rayons; ethyl cellulose; fibers prepared from amylose, algins, or pectins;

wool; silk; animal hair; mohair; leather; fur; regenerated protein fibers prepared from casein, soybean, peanut proteins, zein, gluten, egg albumin, collagen, or keratins; nylon; polyurethane fibers; polyester fibers as polyethylene terephthalate; polyacrylonitrile-based fibers; or fibers of inorganic origin such as asbestos, glass, etc. The invention may be applied to texile material which are in the form of bulk fibers, filaments, yarns, threads, slivers, roving, top, webbing, cord, tape, woven or knitted fabrics, felts or other non-woven fabrics, garments or garment parts.

EXAMPLES

The invention is further demonstrated by the following illustrative examples. The various tests described in the examples were carried out as described below:

Oil repellency.—The 3M repellency test described by Crajack and Petersen, Textile Research Journal, 32, pages 320–331, 1962. Ratings are from 0 to 150, with the higher values signifying the greater resistance to oil penetration.

Water repellency.—AATC spray test, method 22–1952. Ratings are from 0 to 100, with the higher values signifying greater resistance to water penetration.

EXAMPLE I

Preparation of $\beta,\beta'$-dichloropentafluoroisopropyl allyl ether

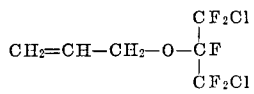

A dry, 250-ml., three-neck flask was fitted with a Dry Ice reflux condenser, gas-inlet tube, and magnetic stirring bar. Sixteen and eight-tenths grams (0.30 mole) dry potassium fluoride was placed in the flask, followed by 100 cc. diglyme. This dispersion was cooled to minus 40° C. by applying a Dry Ice cooling bath to the flask. Sixty grams (0.30 mole) of sym-dichlorotetrafluoroacetone was introduced into the flask. The cooling bath was then removed and the system allowed to come to room temperature. As the system warmed, formation of the fluorocarbinolate was evidenced by the disappearance of the dispersed KF, giving a homogeneous solution.

Thus, 36 grams (0.30 mole) allyl bromide was added in one batch. The Dry Ice condenser was replaced with a water condenser and the reaction mixture was heated for 10 hours at 80–90° C. The solid precipitate of potassium bromide was then removed by filtration and the filtrate poured into 250 cc. of cold water. The lower (fluorocarbon) layer was removed and washed three times with 50-cc. portions of water. Forty grams of crude product was obtained. This product was purified by fractional distillation yielding 20 grams of pure allyl ether, B.P. 130° at 760 mm.

*Analysis.*—Calculated for $C_6F_5Cl_2H_5O$ (percent): C, 27.79%; F, 36.67%; Cl, 27.41%; H, 1.97. Found (percent): C, 28.10%; F, 35.7%; Cl, 27.7%; H, 2.0%.

The infrared and NMR spectra were in accordance with the structure given above.

EXAMPLE II

Preparation of $\beta$-chlorohexafluoroisopropyl allyl ether

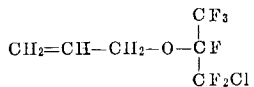

Using the procedure described in Example I, the following materials were applied to the reaction:

Potassium fluoride—41 gm.
Diglyme (solvent)—90 cc.
Monochloropentafluoroacetone—41 gm.
Allyl bromide—28 gm.

Forty grams of crude product was obtained which was distilled to yield the pure allyl ether, B.P. 97° at 760 mm.

*Analysis.*—Calculated for $C_6F_6ClOH_5$ (percent): C, 21.15; F, 46.14; Cl, 14.17. Found (percent): C, 29.42; F, 45.9; Cl, 13.84.

EXAMPLE III

Preparation of heptafluoroisopropyl allyl ether

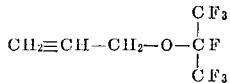

Using the procedure described in Example I, the following materials were applied to the reaction:

Potassium fluoride—15.3 gm.
Diglyme (solvent)—90 cc.
Hexafluoroacetone—44 gm.
Allyl bromide—32 gm.

The allyl ether was obtained in a yield of 68%, B.P. 61°C./760 mm.

*Analysis.*—Calculated for $C_6F_7H_5O$ (percent): C, 31.85; F, 58.85; H, 2.21. Found (percent): C, 31.35; F, 58.4; H, 2.43.

EXAMPLE IV

Polymerization of $\beta,\beta'$-dichloropentafluoroisopropyl allyl ether

A 0.5-gram sample of the monomeric allyl ether, prepared as in Example I, was placed in a small screw-cap vial together with 100 mg. of benzoyl peroxide. The vial was capped and placed in a 100° C. oil-bath for 10 hours. The vial was then removed from the oil-bath, opened and placed in a vacuum oven for 12 hours in order to remove residual monomer. After removal of unreacted monomer, 0.4 gram of a clear, tacky solid remained. The polymer was insoluble in methanol but was soluble in a variety of organic solvents such as acetone, toluene, and N,N-dimethylformamide.

EXAMPLE V

Copolymerization of $\beta,\beta'$-dichlorotetrafluoroisopropyl allyl ether and ethyl methacrylate A mixture of 0.5 gm. ethyl methacrylate, 0.5 gm. $\beta,\beta'$-dichlorotetrafluoroisopropyl allyl ether and 100 mg. benzoyl peroxide were heated in a screw-cap vial at 100° C. for 10 hours as described in Example IV. The resulting clear, brittle solid was dissolved in benzene and precipitated with methanol several times. The solid polymer was then dried and examined by combustion analysis and infrared. Strong absorption bands were seen in the 8–10$\mu$ region for C-F absorption. The polymer contained 15.6% total fluorine.

EXAMPLE VI

Polymerization of heptafluoroisopropyl allyl ether

One gram of heptafluoroisopropyl allyl ether and 100 mg. of benzoyl peroxide were placed in a length of 7-mm. (inner diameter) Pyrex glass tubing, sealed at its lower end. While cooling the contents by immersion of the lower end of the tube in a Dry Ice-acetone bath, the tube was evacuated and the upper end melt-sealed. The tube was then placed in an oil bath and maintained at 100° C. for 6 hours. The resulting viscous oil was removed from the tube and heated in a vacuum oven at 80° C. for 4 hours to remove residual monomer. Four-tenths gram of a clear tacky solid was obtained. This polymer was insoluble in methanol and toluene but readily dissolved in trifluoromethylbenzene.

EXAMPLE VII

Application of poly (heptafluoroisopropyl allyl ether) to wool fabric

The tacky solid polymer described in Example VI was dissolved in trifluoromethylbenzene. Solutions containing from 2 to 10% of the polymer were prepared. Wool swatches were immersed in the polymer solution, squeezed to obtain ca. 100% wet pick-up, dried and cured at 105° for 15 minutes. Oil and water repellency ratings are given below for the treated fabrics.

| Wt. percent of resin on fabric | Oil repellency rating | Water repellency rating |
|---|---|---|
| 70 | 70 | 100 |
| 5 | 50 | 100 |
| 2 | 50 | 100 |
| Control, untreated | 0 | 50 |

Having thus described the invention, what is claimed is:

1. A process for preparing an allyl α-fluoroalkyl ether which comprises—
    (a) dispersing an alkali metal fluoride in an anhydrous inert solvent selected from the group consisting of acetonitrile, dioxide, tetrahydrofuran, tetramethylene sulphone and diglyme for the ketone described below,
    (b) cooling the dispersion to a temperature not above 35° C.,
    (c) adding to the cooled dispersion a ketone of the structure

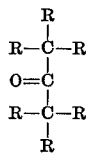

wherein each R is a member of the group consisting of hydrogen, halogen, alkyl, haloalkyl, cycloalkyl, and halocycloalkyl, and wherein at least two of the R's are fluorine,
    (d) warming the resulting reaction mixture to about room temperature,
    (e) without isolating the so-formed intermediate, adding to the reaction mixture an allylic halide selected from the group consisting of allyl chloride, allyl bromide, and allyl iodide,
    (f) stirring the reaction mixture at a temperature of about 50 to 100° C., and
    (g) recovering the so-produced allyl α-fluoroalkyl ether having the structure

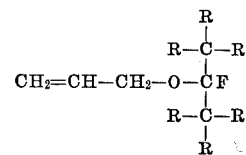

wherein R has the meaning given above.

2. The process of claim 1 wherein the ketone is hexafluoroacetone, and the allyl α-fluoroalkyl ether product is

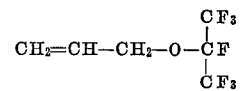

3. The process of claim 1 wherein the ketone is monochloro-pentafluoroacetone ($CF_3$—CO—$CF_2Cl$), and the allyl α-fluoroalkyl ether product is

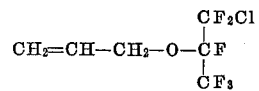

4. The process of claim 1 wherein the ketone is sym-dichloro-tetrafluoroacetone, and the allyl α-fluoroalkyl ether product is

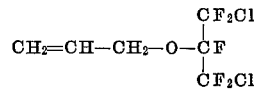

References Cited

UNITED STATES PATENTS

| | | |
|---|---|---|
| 3,331,813 | 7/1967 | Pittman et al. |
| 3,382,222 | 5/1968 | Pittman et al. |
| 3,437,692 | 4/1969 | Pittman et al. |

HOWARD T. MARS, Primary Examiner